United States Patent [19]

Saitou

[11] 4,436,256
[45] Mar. 13, 1984

[54] REEL SHAFT/REEL HUB FITTING APPARATUS

[75] Inventor: Sinichi Saitou, Tokyo, Japan

[73] Assignee: Olympus Optical Co., Ltd., Tokyo, Japan

[21] Appl. No.: 265,416

[22] Filed: May 19, 1981

[30] Foreign Application Priority Data

Jun. 4, 1980 [JP] Japan .............................. 55-77523[U]
Jun. 4, 1980 [JP] Japan .............................. 55-77525[U]

[51] Int. Cl.³ ....................... G03B 1/04; G11B 15/32; G11B 23/04
[52] U.S. Cl. .................................................. 242/200
[58] Field of Search ................ 242/197, 199, 200, 68, 242/68.1, 68.3; 360/96.1, 96.3, 132

[56] References Cited

U.S. PATENT DOCUMENTS 3,756,521 9/1973 Werner ............................. 242/200
3,971,071 7/1976 Urayama ........................... 360/132

FOREIGN PATENT DOCUMENTS 53-15314 2/1978 Japan .

*Primary Examiner*—Leonard D. Christian
*Attorney, Agent, or Firm*—Frishauf, Holtz, Goodman & Woodward

[57] ABSTRACT

A reel shaft/reel hub fitting apparatus for fitting a reel hub of a tape cassette and reel shaft of a magnetic recording tape running apparatus comprises at least one engaging projection mounted on the outer circumferential surface of the reel shaft and having two side faces which edge away from each other along the circumferential direction as the side faces extend in the direction in which the reel shaft is fitted in said reel hub, walls formed on the reel hub and engaging the reel shaft along the axis of rotation thereof when the reel hub is fitted on the reel shaft, thereby defining the position of the reel hub relative to the reel shaft along the axis of rotation, and at least one engaged projection formed on the inner circumferential surface of the reel hub and located within the locus of rotation of the two side faces of the engaging projection when the position of the reel hub relative to the reel shaft along the axis of rotation is defined by the walls.

12 Claims, 6 Drawing Figures

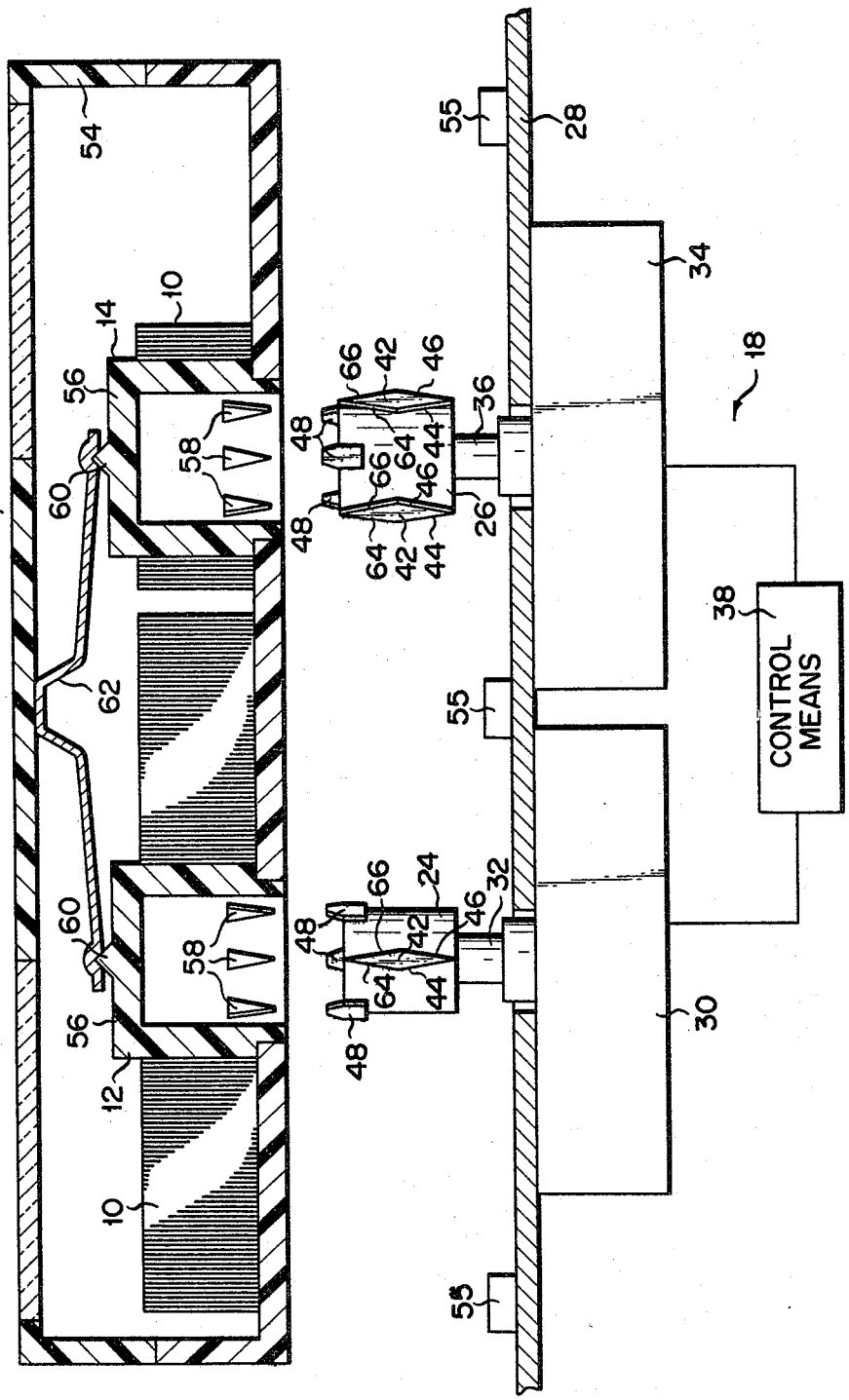

4,436,256

REEL SHAFT/REEL HUB FITTING APPARATUS

BACKGROUND OF THE INVENTION

This invention relates to a reel shaft/reel hub fitting apparatus for fitting reel hubs of a tape cassette on reel shafts of a magnetic recording tape running apparatus.

Reel hubs of a prior art tape cassette can move through a small distance along their respective axes of rotation. Formed on the inner circumferential surface of each reel hub is a plurality of pins which project inward in the radial direction. Formed on the outer circumferential surface of each reel shaft of a prior art magnetic recording tape running apparatus, on the other hand, is a plurality of wings which project outward in the radial direction. When the reel hubs of the tape cassette are fitted on the reel shafts of the magnetic recording tape running apparatus, the housing of the tape cassette is maintained in a predetermined position by support members of the magnetic recording tape running apparatus. At this time, the wings of the reel shafts engage the pins of the reel hubs only along the circumferential direction. Therefore, if the magnetic recording tape running apparatus is subjected to any vibration while the reel hubs are being driven by the reel shafts to rotate, the reel hubs will move along their respective axes of rotation or incline with respect to such axes. Then, the longitudinally extending edge of a magnetic recording tape comes in slide contact with the inner surface of the housing of the tape cassette to change the running speed of the magnetic recording tape suddenly. This will cause wow or flutter if the magnetic recording tape running apparatus is a tape recorder. Further, the slide contact between the magnetic recording tape and the housing of the tape cassette will produce sound. Such sound will constitute noise if the magnetic recording tape running apparatus is a tape recorder in which the RECORD mode is established.

SUMMARY OF THE INVENTION

The object of this invention is to provide a reel shaft/reel hub fitting apparatus capable of preventing reel hubs from moving along their respective axes of rotation and from inclining with respect thereto, thereby preventing sudden change of the running speed of the magnetic recording tape and production of noise.

BRIEF DESCRIPTION OF THE DRAWINGS

FIG. 6 is a sectional view taken along the same line as FIG. 2 and showing a state in which the reel shafts of FIG. 2 are disengaged from the reel hubs of FIG. 2.

DETAILED DESCRIPTION OF THE PREFERRED EMBODIMENT

Figure 1:
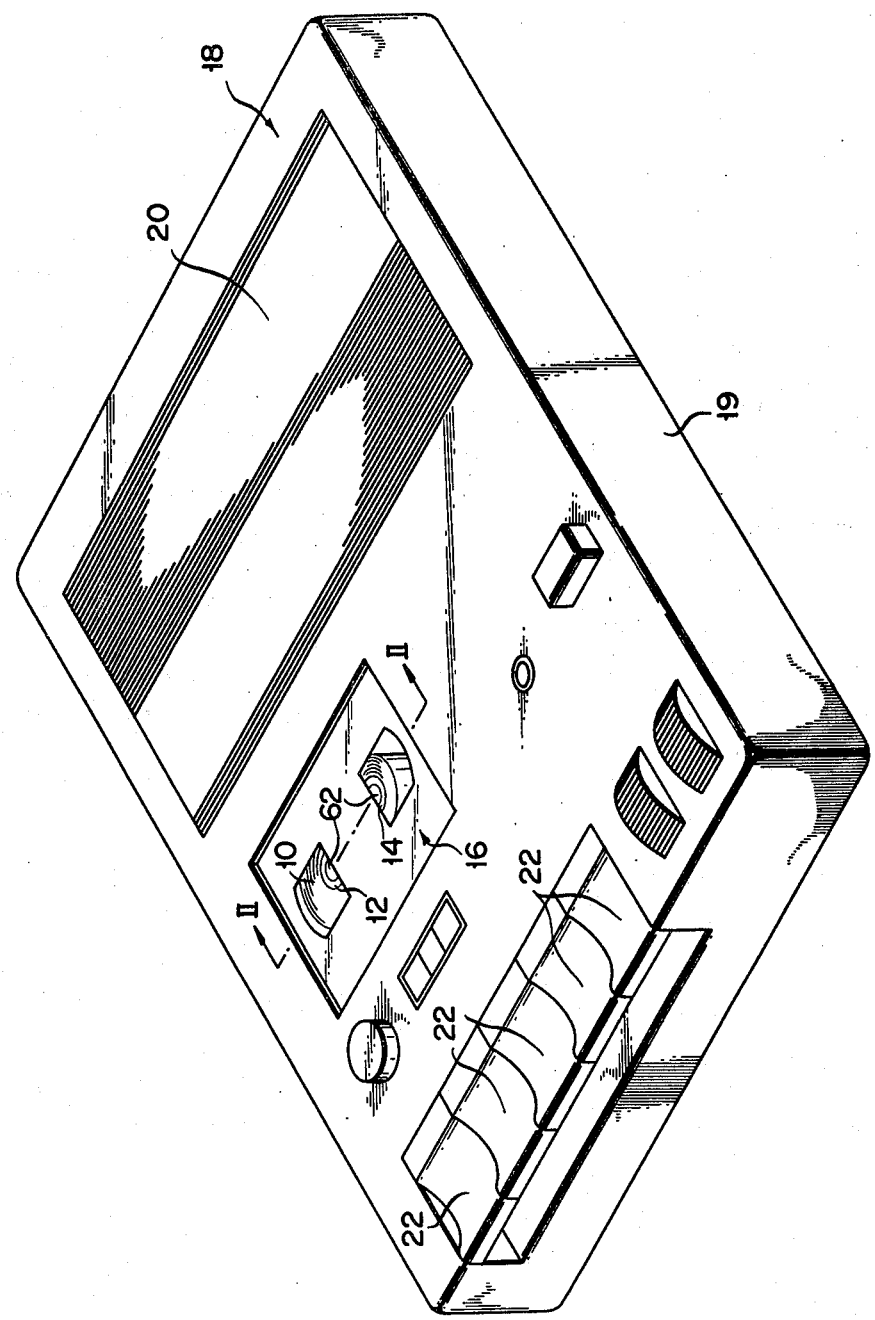
FIG. 1 is a perspective view showing a magnetic recording tape running apparatus having reel shafts as components of an embodiment of this invention, and a tape cassette having reel hubs as components of the embodiment, the former being loaded with the latter.

Referring now to FIG. 1, there are shown a tape cassette 16 having a pair of reel hubs 12 and 14 on which a magnetic recording tape 10 is wound, and a magnetic recording tape running apparatus 18 loaded with the tape cassette 16. In this embodiment, the magnetic recording tape running apparatus 18 is a tape recorder. As shown in FIG. 1, a housing 19 of the magnetic recording tape running apparatus 18 is provided with a speaker 20 and a plurality of mode selector buttons 22. When one of these mode selector buttons 22 is depressed, one of various modes, such as PLAY, RECORD, FF (fast forward), REWIND, and STOP modes, is established in the magnetic recording tape running apparatus 18.

Figure 2:
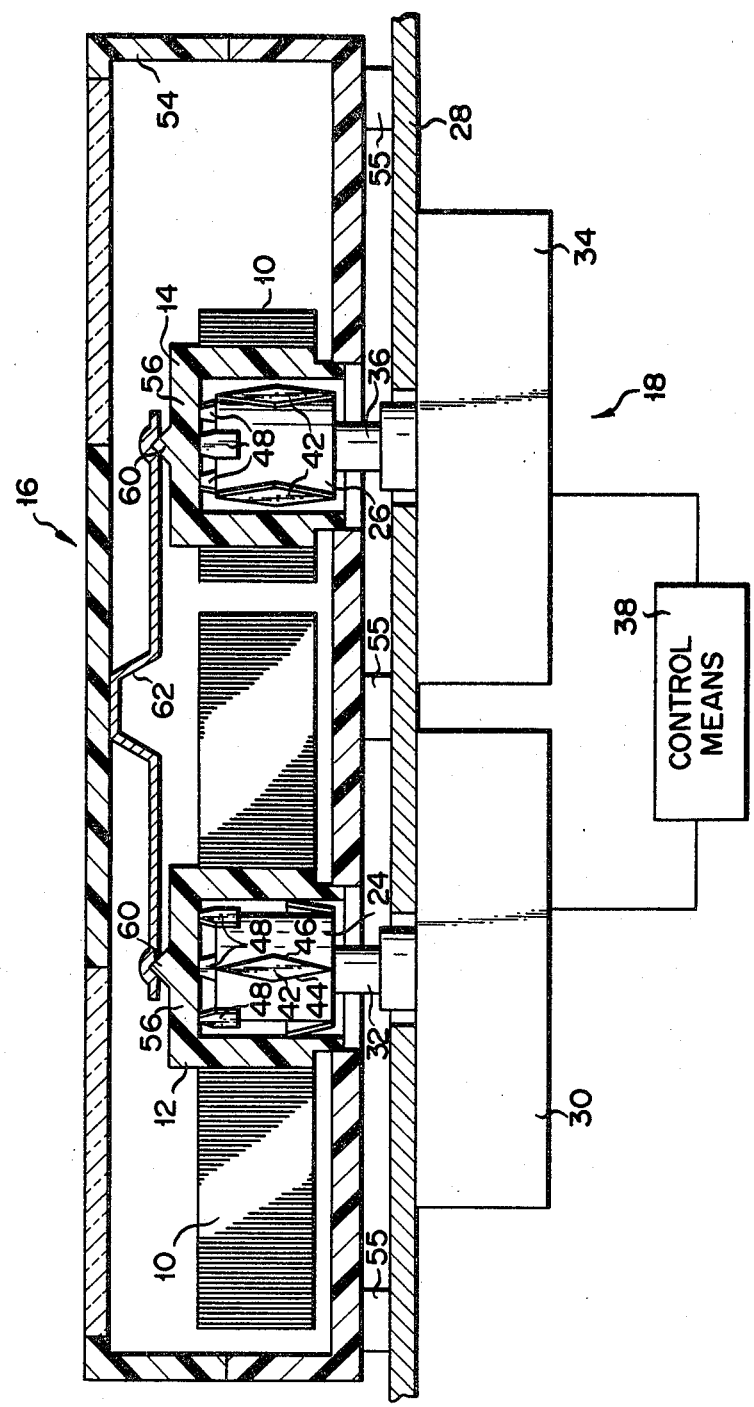
FIG. 2 is a schematic sectional view taken along line II—II of FIG. 1.

As shown in FIG. 2, the magnetic recording tape running apparatus 18 is provided with a pair of reel shafts 24 and 26 which are fitted respectively with the pair of reel hubs 12 and 14 of the tape cassette 16. One reel shaft 24 is fixed to an output shaft 32 of a first electric motor 30 which is fixed on a chassis 28 contained in the housing 19 of the magnetic recording tape running apparatus 18. The other reel shaft 26 is fixed to an output shaft 36 of a second electric motor 34 which is fixed on the chassis 28. As shown in FIG. 2, the first and second motors 30 and 34 are electrically connected with a control means 38 which is operated by means of the mode selector buttons 22 of the magnetic recording tape running apparatus 18. When one of the mode selector buttons 22 is depressed to establish the PLAY, RECORD, or FF mode in the magnetic recording tape running apparatus 18, for example, the control means 38 rotates the one reel shaft 24 in one direction to make the shaft 24 function as a take-up-side reel shaft. At the same time, the other reel shaft 26 functioning as a supply-side reel shaft is subjected to a torque smaller than the torque on the one reel shaft 24 and acting in the other direction. When another mode selector button 22 is depressed to establish the REWIND mode in the apparatus 18, the control means 38 rotates the other reel shaft 26 in the other direction to make the shaft 26 function as the take-up-side reel shaft. At the same time, the one reel shaft 24 functioning as the supply-side reel shaft is subjected to a torque smaller than the torque on the other reel shaft 26 and acting in the one direction. In this embodiment, the control means 38 controls the torque produced by the first and second motors 30 and 34 by regulating the voltage supplied to these motors.

Figure 3:
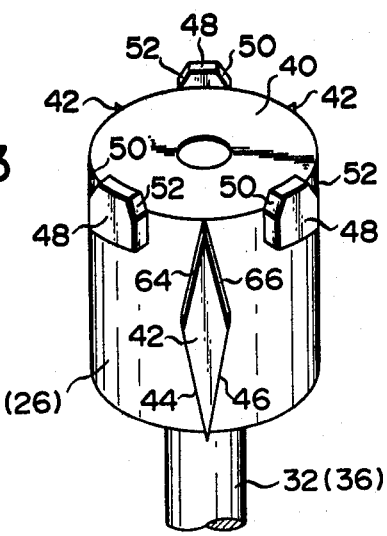
FIG. 3 is a perspective view of the reel shaft of FIG. 2.

As shown expressly in detail in FIG. 3, each of the reel shafts 24 and 26 has a cylindrical main body 40. Formed on the outer circumferential surface of the main body 40 are three engaging projections 42 which are arranged at regular intervals along the circumferential direction. These three engaging projections 42 are rhombic and protrude outward in the radial direction of the output shaft 32 or 36. A straight line connecting two opposite vertexes of each engaging projection 42 is parallel to the axis of rotation of the output shaft 32 or 36. Thus, the engaging projection 42 has two side faces 44 and 46 which edge away from each other (i.e., incline away from each other) along the circumferential direction as they extend upward as in FIG. 3, that is, in a direction in which the reel shaft 24 or 26 is fitted in the reel hub 12 or 14. Three protrusions 48 are formed on the outer circumferential surface of the main body 40 so as to be each located halfway between each two adjacent engaging projections 42. The protrusions 48 protrude upward from the upper end face of the main body 40, as shown in FIG. 3. The distances between the respective upper end faces of the three protrusions 48 and the upper end face of the main body 40 are equal. Two side faces 50 and 52 are formed on the projected or upper end corner of each protrusion 48. Two side faces 50 and 52 edge up to each other (i.e., are inclined toward each other) along the circumferential direction as they extend in the aforesaid fitting direction. When the output shaft 32 or 36 is rotated, the outer circumferential surfaces of the three engaging projections 42 and the outer circumferential surfaces of the three protrusions 48 generate the same locus of rotation.

Figure 4:
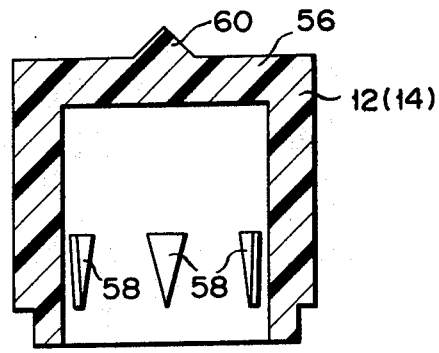
FIG. 4 is a sectional view taken along the same line as FIG. 2 and showing only the reel hub of FIG. 2.

As shown in FIG. 2, the tape cassette 16 has a housing 54 which contains therein the pair of reel hubs 12 and 14 and the magnetic recording tape 10. When the tape cassette 16 is set in the magnetic recording tape running apparatus 18, that is, when the reel hubs 12 and 14 of the tape cassette 16 are fitted on the reel shafts 24 and 26 of the magnetic recording tape running apparatus 18, respectively, the housing 54 of the tape cassette 16 abuts against a plurality of support members 55 on the top of the chassis 28 of the apparatus 18, and engages tape cassette locating pins (not shown) of the apparatus 18, thereby maintaining itself in a predetermined position relative to the apparatus 18. Formed on the inner circumferential surface of each of the reel hubs 12 and 14 is a wall 56 which projects inward in the radial direction. As shown in FIG. 2, the upper end faces of the protrusions 48 of the reel shafts 24 and 26 fitted in the reel hubs 12 and 14 abut against the inner surfaces of their corresponding walls 56. When the protrusions 48 abut against the walls 56, the reel shafts 24 and 26 engage the reel hubs 12 and 14 in the direction of their respective axes of rotation, so that the reel hubs 12 and 14 are located relatively to the reel shafts 24 and 26 along the axes of rotation. This means that the walls 56 serve as locating means. When the walls 56 are in contact with the protrusions 48, the magnetic recording tape 10 wound on the outer circumferential surfaces of the reel hubs 12 and 14 is separated from the inner surface of the housing 54 of the tape cassette 16, as shown in FIG. 2. The position of the reel hubs 12 and 14 in this state is defined as a first position of the reel hubs 12 and 14. Formed on the inner circumferential surface of each of the reel hubs 12 and 14 are six engaged projections 58 which are arranged at regular intervals along the circumferential direction and project inward in the radial direction. In this embodiment, each engaged projection 58 is in the shape of an isosceles triangle. That vertex of the engaged projection 58 which faces the shorter side is disposed opposite to the fitting direction. As shown in FIG. 2, moreover, the engaged projections 58 are located within the locus of rotation of the two side faces 44 and 46 of the engaging projections 42 when the upper end faces of the protrusions 48 of the reel shafts 24 and 26 are in contact with the walls 56 of the reel hubs 12 and 14. On the outer surface of the wall 56 of each of the reel hubs 12 and 14, as shown in FIGS. 2 and 4, a conical projection 60 is formed in the center of rotation of the reel hub 12 or 14.

As shown in FIG. 2, an urging means 62 formed of a leaf spring is disposed inside the housing 54 of the tape cassette 16. One end of the urging means 62 abuts against the vertex of the conical projection 60 of the one reel hub 12, while the other end of the urging means 62 abuts against the vertex of the conical projection 60 of the other reel hub 14. The middle portion of the urging means 62 is fixed to the inner surface of the top wall of the housing 54. The urging means 62 urges the reel hubs 12 and 14 in the opposite direction to the fitting direction, that is, toward the bottom wall of the housing 54.

Now there will be described the operation of the embodiment of this invention constructed in the above-mentioned manner.

Here let us suppose that the reel hubs 12 and 14 of the tape cassette 16 are fitted on the reel shafts 24 and 26 of the magnetic recording tape running apparatus 18, and that the upper end faces of the respective protrusions 48 of the reel shafts 24 and 26 are in contact with the inner surfaces of the respective walls 56 of the reel hubs 12 and 14, as shown in FIG. 2.

Further, let it be supposed that one of the mode selector buttons 22 is depressed to establish the PLAY, RECORD, or FF mode in the magnetic recording tape running apparatus 18. In this case, the control means 38 controls the first motor 30 to rotate the one reel shaft 24 in the one direction, thereby making the shaft 24 function as the take-up-side reel shaft. At the same time, the control means 38 controls the second motor 34 to subject the other reel shaft 26 functioning as the supply-side reel shaft to the torque smaller than the torque on the one reel shaft 24 and acting in the other direction. Then, the magnetic recording tape 10 is run by a difference between the torques produced by the reel shafts 24 and 26 as it is subjected to a back tension from the other reel hub 14 to the one reel hub 12. Receiving the back tension while running, the magnetic recording tape 10 will never slacken on the outer circumferential surfaces of the reel hubs 12 and 14 or between these reel hubs, thus causing no wow or flutter.

Figure 5:
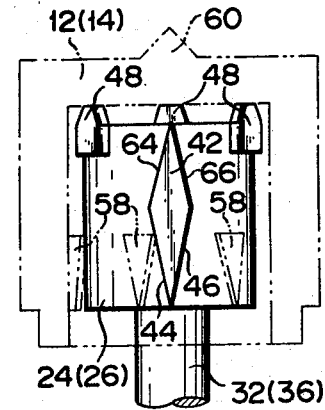
FIG. 5 is a side view showing how engaging projections of the reel shaft engage engaged projections of the reel shaft.

When the magnetic recording tape 10 runs from the other reel hub 14 to the one reel hub 12, the side faces 44 of the respective engaging projections 42 of the reel shafts 24 and 26 abut against the respective engaged projections 58 of the reel hubs 12 and 14, as shown in FIG. 5. Engaging the side faces 44 of the engaging projections 42, the engaged projections 58 of the reel hubs 12 and 14 are subjected to a force applied in the opposite direction to the aforesaid fitting direction, that is, downward as in FIG. 5. This force adds to the force of abutment of the upper end faces of the respective protrusions 48 of the reel shafts 24 and 26 against the inner surfaces of the respective walls 56 of the reel hubs 12 and 14. The increase of the abutment force prevents the reel hubs 12 and 14 from moving along their respective axes of rotation and from inclining with respect to such axes when some vibration is applied to the magnetic recording tape running apparatus 18 in which the PLAY, RECORD, or FF mode is established. Since such movement of the reel hubs 12 and 14 is prevented, it is possible to prevent the longitudinally extending edge of the magnetic recording tape 10 from sliding on the inner surfaces of the bottom and top walls of the housing 54 of the tape cassette 16. Further, it is possible to prevent sudden change of the tape running speed which may cause wow or flutter, as well as to prevent production of noise.

Now let it be supposed that one of the mode selector buttons 22 is depressed to establish the REWIND mode in the magnetic recording tape running apparatus 18. In this case, the control means 38 controls the second motor 34 to rotate the other reel shaft 26 in the other direction, thereby making the shaft 26 function as the take-up-side reel shaft. At the same time, the control means 38 controls the first motor 30 to subject the one reel shaft 24 functioning as the supply-side reel shaft to the torque smaller than the torque on the other reel shaft 26 and acting in the one direction. Then, the magnetic recording tape 10 is run by a difference between the torques produced by the reel shafts 24 and 26 as it is subjected to a back tension from the one reel hub 12 to the other reel hub 14. Receiving the back tension while running, the magnetic recording tape 10 will never slacken on the outer circumferential surfaces of the reel hubs 12 and 14 or between these reel hubs, thus causing no wow or flutter.

When the magnetic recording tape 10 runs from the one reel hub 12 to the other reel hub 14, the side faces 46 of the respective engaging projections 42 of the reel shafts 24 and 26 abut against the respective engaged projections 58 of the reel hubs 12 and 14. Then, the engaged projections 58 of the reel hubs 12 and 14 are subjected to a force applied in the opposite direction to the aforesaid fitting direction, so that the force of abutment of the upper end faces of the respective protrusions 48 of the reel shafts 24 and 26 against the inner surfaces of the respective walls 56 of the reel hubs 12 and 14 is increased. The increase of the abutment force prevents the reel hubs 12 and 14 from moving along their respective axes of rotation and from inclining with respect to such axes when some vibration is applied to the magnetic recording tape running apparatus 18 in which the REWIND mode is established. Since such movement of the reel hubs 12 and 14 is prevented, it is possible to prevent the longitudinally extending edge of the magnetic recording tape 10 from sliding on the inner surfaces of the bottom and top walls of the housing 54 of the tape cassette 16. Further, it is possible to prevent sudden change of the tape running speed which may cause wow or flutter, as well as to prevent production of noise.

Further, let it be supposed that one of the selector buttons 22 is depressed to establish the STOP mode in the magnetic recording tape running apparatus 18. In this case, the control means 38 ceases to supply current to the first and second motors 30 and 34, thereby stopping the rotation of the reel shafts 24 and 26. When the tape cassette 16 is lifted up as in FIG. 2 after the rotation of the reel shafts 24 and 26 is stopped, the respective walls 56 of the reel hubs 12 and 14 are maintained in contact with the upper end faces of the respective protrusions 48 of the reel shafts 24 and 26 by the urging force of the urging means 62 until the longitudinally extending edge of the magnetic recording tape 10 wound on the reel hubs 12 and 14 abuts against the inner surface of the bottom wall of the housing 54. After the longitudinally extending edge of the magnetic recording tape 10 is caused to abut against the inner surface of the bottom wall of the housing 54, the walls 56 of the reel hubs 12 and 14 are separated from the upper end faces of the protrusions 48 of the reel shafts 24 and 26, and thus the reel hubs 12 and 14 are disengaged from the reel shafts 24 and 26, as shown in FIG. 6.

The position of the reel hubs 12 and 14 where the longitudinally extending edge of the magnetic recording tape 10 wound on the reel hubs 12 and 14 is in contact with the inner surface of the bottom wall of the housing 54, as shown in FIG. 6, is defined as a second position. Since the reel hubs 12 and 14 are located in the second position by the urging force of the urging means 62, the magnetic recording tape 10 wound on the outer circumferential surfaces of the reel hubs 12 and 14 will never slacken even if the tape cassette 16 is subjected to any vibration while it is being carried. Thus, wow or flutter attributable to tape slackening can be prevented.

In fitting the reel shafts 24 and 26 in the reel hubs 12 and 14, one of the two side faces 50 and 52 of each protrusion 48 of the reel shafts 24 and 26 and one of two side faces 64 and 66 parallel to the two side faces 46 and 44 of each engaging projection 42 abut against one of the two longer sides of each engaged projection 58 of the reel hubs 12 and 14. Thus, the respective protrusions 48 and engaging projections 42 of the reel shafts 24 and 26 abut against the respective engaged projections 58 of the reel hubs 12 and 14, so that the reel shafts 24 and 26 will never be fitted in the reel hubs 12 and 14 along their respective axes of rotation before the upper end faces of the protrusions 48 abut against the respective walls 56 of the reel hubs 12 and 14. This facilitates secure and simple fitting of the reel shafts 24 and 26 in the reel hubs 12 and 14.

As described in detail herein, the reel shaft/reel hub fitting apparatus according to this invention comprises at least one engaging projection mounted on the outer circumferential surface of a reel shaft and having two side faces which edge away from each other along the circumferential direction as the side faces extend in the direction in which the reel shaft is fitted in a reel hub, locating means disposed on the reel hub and engaging the reel shaft along the axis of rotation thereof when the reel hub is fitted on the reel shaft, thereby defining the position of the reel hub relative to the reel shaft along the axis of rotation, and at least one engaged projection formed on the inner circumferential surface of the reel hub and located within the locus of rotation of the two side faces of the engaging projection when the position of the reel hub relative to the reel shaft along the axis of rotation is defined by the locating means.

With such construction, the reel hub can be prevented from moving along the axis of rotation and from inclining with respect thereto, so that it is possible to prevent sudden change of the running speed of a magnetic recording tape and production of noise.

It is preferable that the locating means is a wall inwardly projecting from the reel hub in the radial direction thereof, and the reel shaft is provided with a plurality of protrusions projecting along the axis of rotation to abut against the wall.

With such construction, the construction and manufacture of the locating means can be simplified and facilitated, and the contact portion of the reel shaft on the locating means can be improved in levelness, as compared with a reel shaft with no such protrusions.

It is preferable that two side faces are formed on the projected end corner of each of the plurality of protrusions, and two side faces edge up to each other along the circumferential direction as the side faces extend in the fitting direction.

With such construction, the fitting of the reel shaft in the reel hub can be secured and facilitated.

It is preferable that a plurality of engaging projections are arranged at regular intervals along the circumferential direction, and the plurality of protrusions are arranged between the plurality of engaging projections on the outer circumferential surface of the reel shaft.

With such construction, the fitting of the reel shaft in the reel hub can be secured and facilitated.

It is preferable that each of the engaging projections is in the shape of a rhombus arranged so that a straight line connecting two facing vertexes of the rhombus is parallel to the axis of rotation.

With such construction, the fitting of the reel shaft in the reel hub can be secured and facilitated.

It is preferable that the engaged projection is in the shape of a triangle one vertex of which is disposed opposite to the fitting direction.

With such construction, the fitting of the reel shaft in the reel hub can be secured and facilitated.

It is preferable that the reel hub can move along the axis of rotation within the housing of a tape cassette, and the housing contains therein urging means which urges the reel hub in the opposite direction to the fitting direction so as to cause a magnetic recording tape wound on the reel hub to abut against the housing of the tape cassette when the reel hub is disengaged from the reel shaft.

With such construction, the magnetic recording tape wound on the reel hub will never slacken even if the tape cassette is subjected to an vibration while it is being carried after the reel shaft is disengaged from the reel hub.

It is preferable that the reel shaft/reel hub fitting apparatus can further comprise another reel hub and another reel shaft.

It is preferable that the reel shaft/reel hub fitting apparatus further comprises another reel shaft and another reel hub, and the magnetic recording tape running apparatus includes two electric motors for independently rotating the two reel shafts, and control means for controlling the two electric motors to keep a torque produced by the take-up-side reel shaft always greater than a torque produced by the supply-side reel shaft.

With such construction, the magnetic recording tape running from the supply-side reel shaft to the take-up-side reel shaft can always be subjected to a back tension, so that it is possible to prevent the magnetic recording tape from slackening on and between these two reel shafts.

It is preferable that the control means rotates the take-up-side reel shaft in one direction and the supply-side reel shaft in the other direction.

With such construction, production of desired back tension can be facilitated.

Although illustrative embodiments of this invention have been described in detail herein, it is to be understood that the invention is not limited to those precise embodiments, and that various changes and modifications may be effected therein by one skilled in the art without departing from the scope or spirit of the invention.

For example, the engaged projection may be a cylindrical pin which projects inward in the radial direction.

Further, the urging means may be a compression coil spring fixed on the inner surface of the top wall of the housing 54 of the tape cassette 16.

Furthermore, the magnetic recording tape running apparatus may be a video tape recorder.

What is claimed is:

1. A reel shaft/reel hub fitting apparatus for fitting a reel hub of a tape cassette on a reel shaft of a magnetic recording tape running apparatus, said reel shaft/reel hub fitting apparatus comprising:

at least one engaging projection mounting on the outer circumferential surface of said reel shaft and having two side faces which edge away from each other along the circumferential direction as said side faces extend in the direction in which said reel shaft is fitted in said reel hub;

locating means disposed on said reel hub and engaging said reel shaft along the axis of rotation thereof when said reel hub is fitted on said reel shaft, thereby defining the position of said reel hub relative to said reel shaft along said axis of rotation;

said locating means comprising a wall inwardly projecting from said reel hub in the radial direction thereof;

said reel shaft being provided with a plurality of protrusions projecting along said axis of rotation of said reel shaft so as to abut against said inwardly projecting wall of said reel hub; and at least one engaged projection formed on the inner circumferential surface of said reel hub and adapted to engage at least one of said side faces of an engaging projection of said reel shaft, said at least one engaging projection being located within the locus of rotation of said two side faces of said engaging projection when the position of said reel hub relative to said reel shaft along said axis of rotation is defined by said locating means.

2. A reel shaft/reel hub fitting apparatus according to claim 1, further comprising urging means coupled to said reel hub for urging said reel hub onto said reel shaft so as to maintain said protrusions of said reel shaft in abutment with said inwardly projecting wall of said reel hub.

3. A reel shaft/reel hub fitting apparatus according to claim 1, wherein each of said plurality of protrusions comprise a projected end corner, said projected end corners of each of said plurality of protrusions having two side faces which edge up to each other along said circumferential direction as said side faces extend in said fitting direction.

4. A reel shaft/reel hub fitting apparatus according to claim 1, wherein a plurality of said engaging projections are arranged at regular intervals along said circumferential direction, and said plurality of protrusions are arranged between said plurality of engaging projections on the outer circumferential surface of said reel shaft.

5. A reel shaft/reel hub fitting apparatus according to claim 4, wherein each said engaging projection is substantially in the shape of a rhombus arranged so that a straight line connecting two facing vertexes of the rhombus is parallel to said axis of rotation.

6. A reel shaft/reel hub fitting apparatus according to claim 5, wherein said engaged projection is substantially in the shape of a triangle, one vertex of which is disposed opposite to said fitting direction.

7. A reel shaft/reel hub fitting apparatus according to claim 1, wherein said reel hub is movable along said axis of rotation within the housing of said tape cassette, and said housing contains therein urging means which urges said reel hub in the opposite direction to said fitting direction so as to cause a magnetic recording tape wound on said reel hub to abut against the housing of said tape cassette when said reel hub is disengaged from said reel shaft.

8. A reel shaft/reel hub fitting apparatus according to claim 1, further comprising another reel hub and another reel shaft having said reel shaft/reel hub fitting apparatus therein.

9. A reel shaft/reel hub fitting apparatus according to any one of claims 1, 3, 4, 5 or 6, wherein said reel hub is movable along said axis of rotation within the housing of said tape cassette, and said housing contains therein urging means which urges said reel hub in the opposite direction to said fitting direction so as to cause a magnetic recording tape wound on said reel hub to abut against the housing of said tape cassette when said reel hub is disengaged from said reel shaft.

10. A reel shaft/reel hub fitting apparatus according to claim 9, further comprising another reel hub and another reel shaft having said reel shaft/reel hub fitting apparatus thereon.

11. A reel shaft/reel hub fitting apparatus according to any one of claims 1, 3, 4, 5, 6 or 7, further comprising another reel shaft and another reel hub; and wherein said magnetic recording tape running apparatus includes two electric motors for independently rotating said two reel shafts, and control means for controlling said two electric motors to keep a torque produced by the take-up-side reel shaft always greater than a torque produced by the supply-side reel shaft.

12. A reel shaft/reel hub fitting apparatus according to claim 11, wherein said control means rotates said take-up-side reel shaft in one direction and said supply-side reel shaft in the other direction.

* * * * *